(12) United States Patent
Björkner et al.

(10) Patent No.: US 8,634,544 B2
(45) Date of Patent: Jan. 21, 2014

(54) ROUTE SELECT SERVICE

(75) Inventors: Jörgen Björkner, Hägersten (SE);
Henrik Gustafsson, Sollentuna (SE);
Anumeet Singh, Tyresö (SE)

(73) Assignee: Telepo Sweden AB, Stockholm (SE)

( * ) Notice: Subject to any disclaimer, the term of this patent is extended or adjusted under 35 U.S.C. 154(b) by 98 days.

(21) Appl. No.: 12/923,175

(22) Filed: Sep. 8, 2010

(65) Prior Publication Data

US 2011/0116619 A1    May 19, 2011

Related U.S. Application Data

(60) Provisional application No. 61/272,285, filed on Sep. 8, 2009.

(30) Foreign Application Priority Data

Sep. 8, 2009   (SE) ...................................... 0901162

(51) Int. Cl.
*H04M 3/00*   (2006.01)
*H04M 5/00*   (2006.01)
*H04M 7/00*   (2006.01)
*H04L 12/66*  (2006.01)
*H04L 12/28*  (2006.01)
*H04W 40/00*  (2009.01)

(52) U.S. Cl.
USPC ........................................................ 379/272

(58) Field of Classification Search
USPC .............. 379/242, 272, 273, 201.01, 201.02, 379/211.02, 220.01, 221.02, 219, 211.01; 455/415, 417, 445, 428; 370/352, 351
See application file for complete search history.

(56) References Cited

U.S. PATENT DOCUMENTS

| | | | | |
|---|---|---|---|---|
| 8,023,632 | B2* | 9/2011 | Gruchala | 379/201.02 |
| 8,213,587 | B2* | 7/2012 | Vendrow | 379/201.01 |
| 2004/0218748 | A1 | 11/2004 | Fisher | |
| 2006/0256948 | A1* | 11/2006 | Crockett et al. | 379/220.01 |
| 2008/0123629 | A1 | 5/2008 | Ou Yang et al. | |
| 2009/0017794 | A1 | 1/2009 | Wilson | |
| 2009/0180602 | A1* | 7/2009 | Ramanathan et al. | 379/211.02 |
| 2010/0195642 | A1* | 8/2010 | Terpstra et al. | 370/352 |
| 2012/0021730 | A1* | 1/2012 | Vendrow | 455/415 |

FOREIGN PATENT DOCUMENTS

| | | |
|---|---|---|
| EP | 1 646 211 | 4/2006 |
| WO | WO 2005/004521 | 1/2005 |
| WO | WO 2009/045849 | 4/2009 |

OTHER PUBLICATIONS

International Search Report dated Feb. 1, 2011.
Office Action for corresponding Chinese patent application No. 201080040597.2 dated Jun. 18, 2013 with English translation.

* cited by examiner

*Primary Examiner* — Thjuan K Addy
(74) *Attorney, Agent, or Firm* — Harness, Dickey & Pierce, P.L.C.

(57) ABSTRACT

Methods and devices for providing an improved call setup in a telephony network are provided. In at least one embodiment, a telephony terminal sends a call route select request to a call route select server. The call route select server determines a preferred call route from the telephony terminal to the called destination and sends a call route select response to the telephony terminal. The call route select response comprises information on how to setup the call.

10 Claims, 4 Drawing Sheets

ROUTE SELECT SERVICE

PRIORITY STATEMENT

The present application hereby claims priority under 35 U.S.C. §119 to Sweden Patent Application No. 0901162-8, filed on Sep. 8, 2009, and hereby claims priority under 35 U.S.C. §119(e) on U.S. patent application No. 61/272,285 filed Sep. 8, 2009, the entire contents of each of which are hereby incorporated herein by reference.

FIELD

At least one embodiment of the invention relates to the field of telecommunication. More specifically, it relates to methods and devices for setting up a call between a telephony terminal and a destination of the call according to a preferred call route.

BACKGROUND

In current fixed, mobile, and internet protocol (IP) telephony networks, a call that is initiated by a telephony terminal, e.g., a fixed phone, mobile phone, IP phone, or software, is setup according to a route determined by a switch that is deployed centrally in the network. The route used for the call is based on the called destination number and may involve multiple interconnected networks. Typically, a route is chosen according to a number of policies set by the network operators, such as to optimize utilization of available resources or minimize costs for the call.

As an example, FIG. 1 illustrates an existing telephony network 100. A mobile terminal 101 is connected to the core network 103 through a radio access network 102. The user of the mobile terminal 101, or an application executed on mobile terminal 101, can establish a communication session with a destination that is reachable through the core network 103. A communication session may, e.g., be a call to another mobile terminal 105, connected to the core network 103 via a radio access network 104, or to a fixed phone 106. If the core network 103 is connected via 107 to an IP network 108, such as the internet, the call can also be routed to a voice-over-IP (VoIP) capable terminal 109. In general, a communication session is not limited to voice services but may also be established for the purpose of communicating data, e.g., surfing on the world wide web (WWW) by accessing a web server 110, or connecting to a corporate network 111.

Today's mobile phones are typically capable of establishing wireless network connections by virtue of several wireless network technologies, e.g., GSM (Global System for Mobile communications), UMTS (Universal Mobile Telecommunications System), and WLAN (wireless local area network). As an example, with reference to FIG. 1, the mobile terminal 101 can connect to a GSM/UMTS radio access network 102 via a voice connection 112 and/or a data connection 113. Further, the mobile terminal 101 can also establish a connection 114 with a WLAN 115 through a WLAN access point.

Despite the increasing number of possible call routes from a telephony terminal to a destination, the choice of the actual call route is rather rigid and typically limited to a few options, depending on whether the user initiates a voice call or an application running on the telephony terminal requests a data connection.

For example, if the user of a mobile terminal 101 initiates a call, the core network 103 will typically decide how to route the call to its destination. If, on the other hand, the mobile terminal 101 is capable of setting up VoIP calls, e.g., through an application such as Skype, the mobile terminal 101 will route the call over an IP connection to its destination, either over a GSM/UMTS data connection 113 or over a WLAN connection 114. Further, the user can setup a call using services like call-back or two-stage dialing, which are provided by a service provider 119.

As the number of choices to setup a call from a telephony terminal increases, it becomes more complex for users to keep track of different access networks and costs.

SUMMARY

It is a general object of at least one embodiment of the present invention to overcome one or more of these problems, singly or in combination, and the provide an improved call setup.

At least one embodiment is directed to a method of a telephony terminal for setting up a call; at least one embodiment is directed to a method of a call route select server for providing a preferred call route for a call; at least one embodiment is directed to a telephony terminal; at least one embodiment is directed to a call route select server; at least one embodiment is directed to a computer program product. Embodiments of the invention are defined by the dependent claims.

According to a first aspect of the present invention, a method of a telephony terminal for setting up a call between the telephony terminal and a destination of the call according to a preferred call route is provided. The method comprises the steps of transmitting a call route select request to a call route select server, receiving a call route select response from the call route select server, and setting up the call according to the call route select response. The call route select request comprises information pertaining to the destination of the call. The call route select response comprises information on how to setup the call.

According to a second aspect of the invention, a method of a call route select server for providing a preferred call route for a call between a telephony terminal and a destination of the call is provided. The method comprises the steps of receiving a call route select request from the telephony terminal, determining a preferred call route between the telephony terminal and the destination of the call, and transmitting a call route select response to the telephony terminal. The call route select request comprises information pertaining to the destination of the call. The call route select response comprises information on how to setup the call.

According to a third aspect of the present invention, a telephony terminal configured for setting up a call between the telephony terminal and a destination of the call according to a preferred call route is provided. The telephony terminal comprises first circuitry, second circuitry, and third circuitry. The first circuitry is arranged for transmitting a call route select request to a call route select server. The second circuitry is arranged for receiving a call route select response from the call route select server. The third circuitry is arranged for setting up the call according to the received call route select response. The call route select request comprises information pertaining to the destination of the call. The call route select response comprises information on how to setup the call.

According to a fourth aspect of the present invention, a call route select server for providing a preferred call route for a call between a telephony terminal and a destination of the call is provided. The call route select server comprises first circuitry, second circuitry, and third circuitry. The first circuitry is arranged for receiving a call route select request from the telephony terminal. The second circuitry is arranged for determining a preferred call route between the telephony terminal and the destination of the call. The third circuitry is arranged for transmitting a call route select response to the telephony terminal. The call route select request comprises information pertaining to the destination of the call. The call route select response comprises information on how to setup the call.

According to a fifth aspect of the present invention, a computer program product is provided. The computer program product comprises a computer usable medium that has a computer readable program code embodied therein. The computer readable program code is adapted to be executed to implement the method according to the first or second aspect of the present invention.

For the purpose of describing the present invention, a telephony terminal can be fixed or mobile, e.g., be a fixed phone, an IP phone, a mobile phone, a modem, a PDA, or any other device capable of accessing a communication network, e.g., a fixed network or a radio access network such as a mobile telephony network, and establishing a communication session through the network. A telephony terminal may also be a computer executing a software which is capable of establishing a communication session. A communication session can, e.g., be a call or a data connection.

The information transmitted in a call route select request, and pertaining to the destination of the call, can be a phone number of the destination, a network address, or any other identifier that allows to establish a call route to the destination.

The information transmitted in a call route select response, on how to setup the call, may comprise a set of instructions describing the call route as it should be established by the telephony terminal. For example, the telephony terminal can be instructed to proceed with a conventional call setup, i.e., to establish a direct call to the destination number, or to route a VoIP call over a WLAN connection. The telephony terminal may also be instructed to proceed with two-stage dialing or to wait for and to respond to a call-back call.

The call route select request can be transmitted from the telephony terminal to the call route select server through an already established communication session. Typically, a mobile phone that is registered with a mobile telephony network maintains a communication session with the network for the purpose of communicating information pertaining to the network, such as control signaling, measurements or cell changes. Further, a network operator may also configure a mobile terminal to always maintain a data connection for the purpose of supplying contents to the user of the mobile terminal. Such a communication session can be used to send a call route select request from the mobile terminal to the call route select server, and to send a call route select response from the call route select server to the mobile terminal. However, the call route select request and the call route select response may also be transmitted through a WLAN connection or any other connection that is established for that purpose, e.g., a data connection via GSM/UMTS. Further, the signaling protocol used for call setup through GSM/UMTS may be utilized for the purpose of transmitting call route select requests and call route select responses. The short message service (SMS) may also be used for transmitting call route select requests and responses.

The present invention is based on the inventor's realization that the complexity of a call setup involving multiple access networks, i.e., communication networks which the telephony terminal is able to access, and/or multiple network operators can be hidden from the user of a telephony terminal by establishing a call according to a preferred call route which is selected among a plurality of possible call routes through the network, or through several interconnected networks. The general idea of the invention is that a call route select server determines, on request by a telephony terminal, several possible call routes between the telephony terminal and the destination of the call, evaluates the possible call routes, selects a preferred call route, and instructs the requesting telephony terminal how to setup the call. In selecting a preferred call route, the call route select server can take a number of policies, such as available resources and costs, into consideration. Such policies can be set by a network operator, a service provider, and/or the user of a telephony terminal. For example, a network operator can set policies such as to use a call route that makes best use of available resources. A user of a telephony terminal may, e.g., set policies such as to minimize the costs for call. The call route select server may, in determining the preferred call route, interact with other network entities. The server may, e.g., access information pertaining to resources, costs, authorization, and availability of other networks. Further, the call route select server may be located outside the core network and have policies managed by a service provider other than the owner of the core network.

As an alternative, the call route selection may also be performed by the telephony terminal or any other entity of the network infrastructure. This can, e.g., be achieved by supplying the telephony terminal, or the other network entity, with information about network topology, interconnections, available resources, and costs, which is locally stored and utilized in determining a preferred call route.

Traditionally, call control and routing services are provided by the core network, and policies are configured in the interest of the core network owner. However, these interests are not always in line with the interests of the user of a telephony terminal subscribing to the network. The present invention is advantageous in that it allows the routing policies, at least in part, to be moved out from the core network.

Further, the present invention is advantageous in that a user of a telephony terminal can setup a call without facing the complexity of choosing an access network from a plurality of accessible networks, such as a plain old telephony service network (POTS), a fixed computer network, GSM/UMTS, WLAN, or deciding whether to a setup the call as a conventional voice call, as a VoIP call via a data connection, or whether direct call, two-stage dialing, or call-back should be used.

According to an embodiment of the method according to the first aspect of the present invention, the call route select request further comprises information pertaining to the telephony terminal sending the request. The request may, e.g., comprise information pertaining to the capabilities of the telephony terminal, such as whether it is capable of connecting to a WLAN access point, or which networks it is allowed to access.

According to an embodiment of the method according to the first aspect of the present invention, the call route select response further comprises a call identifier. The call is setup by two-stage dialing using the call identifier. This is advantageous since fewer digits have to transmitted from the telephony terminal after the call to the two-stage dialing provider has been established, which results in a faster call setup.

According to an embodiment of the method according to the second aspect of the present invention, the step of determining a preferred call route comprises the steps of determining a plurality of possible call routes between the telephony terminal and the destination of the call, and selecting a preferred call route among said plurality of possible call routes. The step of selecting a preferred call route is based on a set of predetermined policies, such available resources or connection costs.

Even though advantages of the present invention have in some cases been described with reference to embodiments of the method of a telephony terminal for setting up a call according to the first aspect of the invention, corresponding reasoning applies to embodiments of the other aspects of the present invention.

It will also be appreciated that embodiments of the methods according to the first or second aspect of the invention can be implemented as software, in accordance with the fifth aspect of the invention. In that way an existing telephony terminal, such as a mobile phone, can be adapted to perform a call setup in accordance with an embodiment of the first aspect of the invention. This can, e.g., be achieved by supplying an existing telephony terminal with an additional software or by updating the software that the terminal is supplied with. Further, an existing telephony network can be adapted to provide a call route select service by adapting a telephony switch or other entities of the network.

Further objectives of, features of, and advantages with, the present invention will become apparent when studying the following detailed disclosure, the drawings and the appended claims. Those skilled in the art realize that different features of the present invention can be combined to create embodiments other than those described in the following.

BRIEF DESCRIPTION OF THE DRAWINGS

The above features and advantages of the present invention will be better understood through the following illustrative and non-limiting detailed description of embodiments of the present invention, with reference to the appended drawings.

Figure 1:
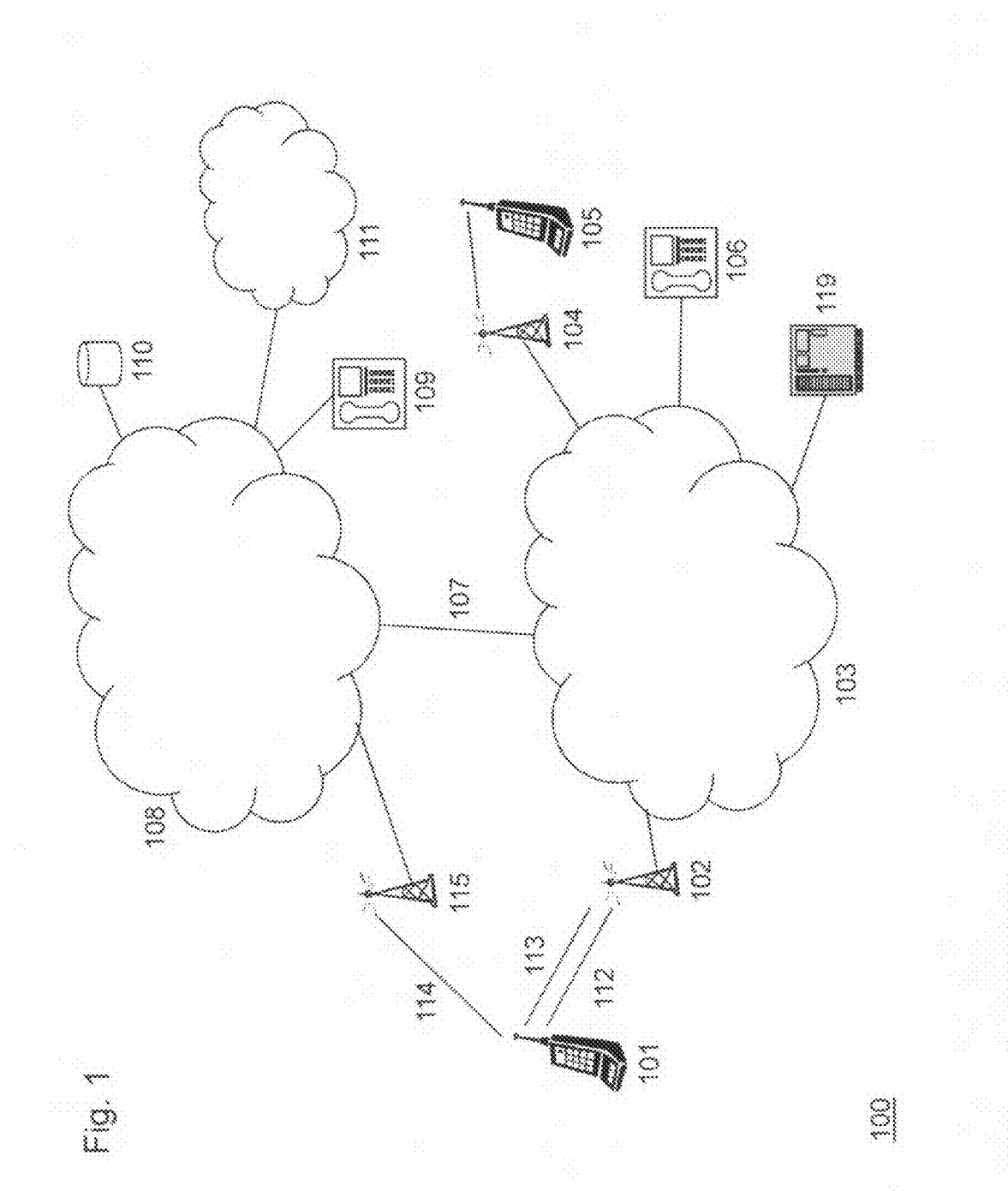
FIG. 1 shows an existing telephony network.

All the figures are schematic, not necessarily to scale, and generally only show parts which are necessary in order to elucidate the invention, wherein other parts may be omitted or merely suggested.

DETAILED DESCRIPTION OF THE EMBODIMENTS OF THE INVENTION

For the purpose of elucidating the present invention, an exemplary embodiment of a telephony network 200 is described with reference to FIG. 2. A mobile terminal 201 is connected to the core network 103 through a radio access network 102. Further, the mobile terminal 201 is, over connection 114, connected to a WLAN network 115, through which an IP network 108 can be reached. A call route select server 216 is accessible through connection 217 from the core network 103, and/or through connection 218 from the IP network 108.

The user of the mobile terminal 201, or an application executed on mobile terminal 201, can establish a communication session with a destination that is reachable through the core network 103 or the IP network 108. A communication session may, e.g., be a call to another mobile terminal 105, connected to the core network 103 via a radio access network 104, or to a fixed phone 106. Further, a communication session may also be a VoIP call to an IP phone 109, or a data connection to a web server 110 or a corporate network 111.

When the mobile terminal 201 requests a communication session, e.g., a call, a call route setup request is sent from the mobile terminal 201 to the call route select server 216. The call route select request can be transmitted over an existing connection, e.g., a connection which is maintained for the purpose of control signaling, or an existing WLAN connection, or over a connection which is established for the purpose of sending the request.

The request can, e.g., be transmitted using existing protocols, such as the short message service (SMS), or the hypertext transfer protocol (HTTP). The request may also be transmitted using an extension of an existing call setup signaling protocol. The transmission of the request can be initiated by the user, either manually, or automatically. Preferably, the telephony terminal is configured to issue a call setup request at each call setup, without requiring interaction with the user.

Figure 2:
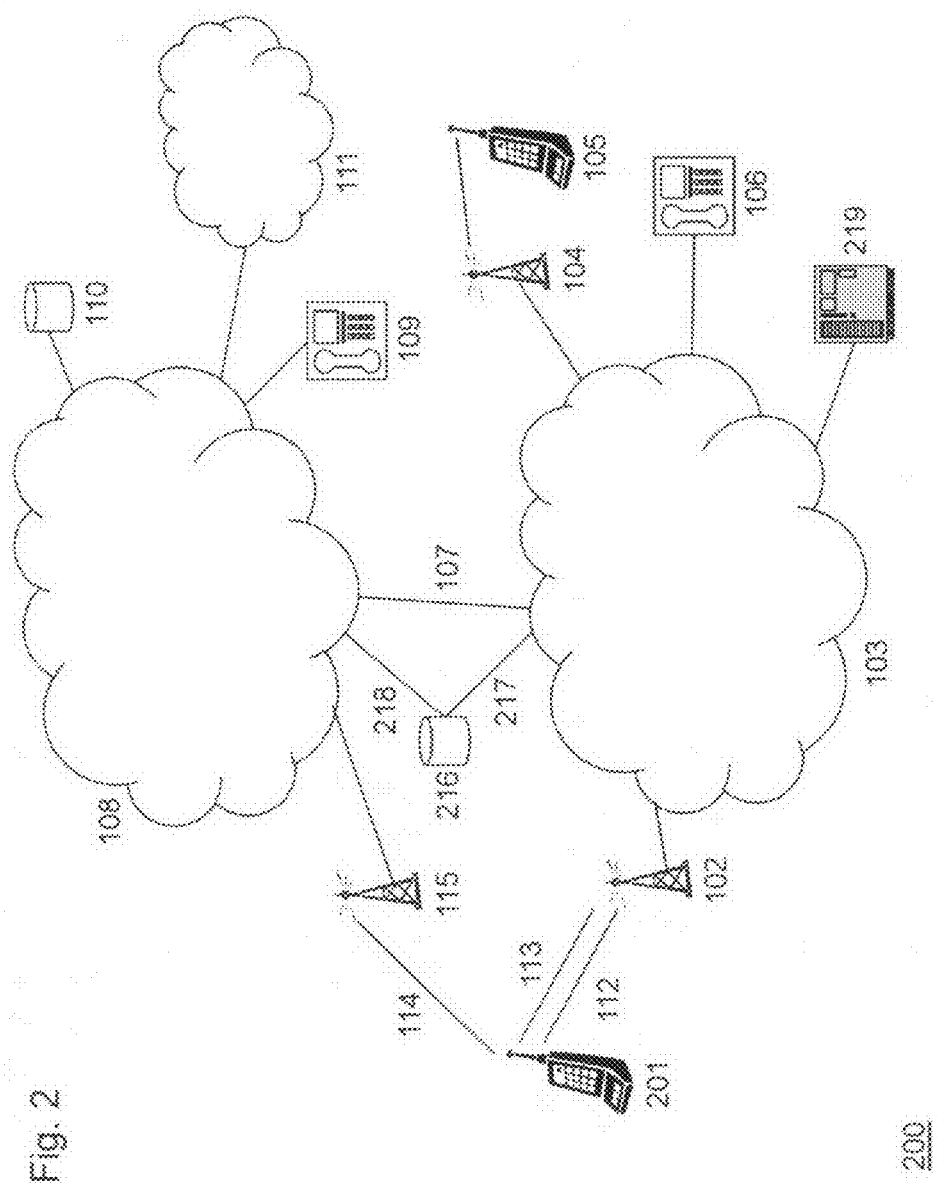
FIG. 2 shows a telephony network in accordance with an embodiment to the invention.

With reference to FIG. 2, the call route select request can be transmitted to the call route select server 216 either through the core network 103, via connection 217, and/or through the IP network 108, via connection 218. For example, the call route select request may be sent over an existing data connection 113, which the mobile terminal 201 maintains with the radio access network 102, and routed to the call route select server 216 through the core network 103.

The call route select request may comprise further information pertaining to the calling party, i.e., the mobile terminal 201, the called destination, or user policies. For example, the call route select request may comprise authentication information, calling party identity, calling party name, device capabilities (voice, video, instant message, GSM, UMTS, WLAN, voice codecs), available networks (IP, GSM, UMTS, WLAN), call type (voice, video), caller preferences (prefer video call, prefer VoIP call), privacy information (show or hide caller identity), or the caller location.

In response to receiving a call route select request, the call route select server 216 determines a plurality of possible call routes for establishing the call. Then, the call route select server 216 selects a preferred call route among the plurality of possible call routes. The selection can, e.g., be based on policies set by the operators of the network which the user of the mobile terminal 201 is subscribed to, by the user of the mobile terminal 201, or by the service supplier operating the call route select server 216. The policies may pertain to the usage of resources, call costs, and the current availability of accessible networks. The selection may further be based on any of the information provided in the call route selection request, in particular information pertaining to user preferences.

After deciding on a preferred call route, the call route select server 216 sends a call route select response to the mobile terminal 201. The call route select response may be transmitted through the same route as the call route select request as exemplified above, or through any other route. The call route select response comprises information, which can be interpreted by the mobile terminal 201, describing how the setup the call. The call route select server 216 may, e.g., instruct the mobile terminal 201 to proceed with a direct call and let the core network 103 take responsibility of routing the call. This option corresponds to a conventional call setup in existing telephony networks. The call route select server 216 may also instruct the mobile terminal 201 to establish a VoIP connection, either through a WLAN network 115 or through a mobile phone network 102. As an alternative, the call route select server 216 may instruct the mobile terminal 201 to wait and answer a call-back call. Further, the call route select server 216 may instruct the mobile terminal 201 to use two-stage dialing by setting up a call to a phone number associated with the provider 219 of a two-stage dialing service, and subsequently, after the two-stage dialing service has answered the call, by transmitting the destination number to the provider 219. The destination number can, e.g., be transmitted using dual-tone multi-frequency (DTMF) signaling. The call-back and two-stage dialing services are, with reference to FIG. 2, illustrated as operated by an external service provider 219. However, call-back and/or two-stage dialing services may also be part of the core network 103 or the IP network 108.

The call route select response may comprise further information such as call authorization (accepted, forbidden), call diversion, networks to use (GMS, UMTS, WLAN), fallback call processing instructions, or information related to called party (name, business card).

In response to receiving the call route select response, the mobile terminal 201 may proceed with establishing the call according to the instructions from the call route select server 216 transmitted in the call route select response. However, the mobile terminal 201 may also ignore the received instructions and establish the call in any other way, either according to a default call route or according to instructions given by the user. This may, e.g., be the case if the mobile terminal 201 fails to interpret the instructions from the call route select server 216, or if the user wishes to setup a call according to a different call route.

If the call route select server 216 selects a call route involving two-stage dialing through a two-stage-dialing service provider 219, the call setup can be performed faster if a call identifier is utilized during call setup. In this case, the call route select server 216 assigns a unique call identifier to the current session, i.e., the identity of the requesting telephony terminal and the identity of the destination of the call, and transmits this information, i.e., the call identifier, the caller identity, and the destination identity, to a two-stage dialing service provider 219. The caller identity and the destination identity can, e.g., be telephone numbers. The call route select server 216 then transmits, in the call route select response, the call identifier to the telephony terminal 201, together with an instruction to setup a call to the two-stage dialing service provider 219. The telephone number of the two-stage dialing service provider 219 can, e.g., be transmitted in the call route select response, but it can also be stored in the telephony terminal 201. In response to receiving the call route select response, the telephony terminal 201 establishes a call with the two-stage dialing service provider 219 and, after the call has been established, transmits the call identifier. The two-stage dialing service provider 219 may then establish the call, which is associated with the received call identifier, according to instructions received from the call route select server 216. Transmitting the call identifier instead of a telephone number is advantageous since the call identifier is typically shorter than a telephone number and additional authentication information, such as a PIN code.

Figure 3:
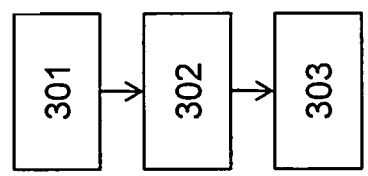
FIG. 3 shows a method of a telephony terminal in accordance with an embodiment of the first aspect of the invention.

With reference to FIG. 3, a method 300 of a telephony terminal according to an embodiment of the first aspect of the invention is described. The method 300 is initiated when a call setup is requested by a user of telephony terminal 201, or by an application executed on telephony terminal 201. The method starts in step 301 with transmitting a call route select request to a call route select server 216. Then, in step 302, a call route select response is received from the call route select server 216. Finally, in step 303, the call is setup in accordance with the instructions transmitted in the call route setup response.

Figure 4:
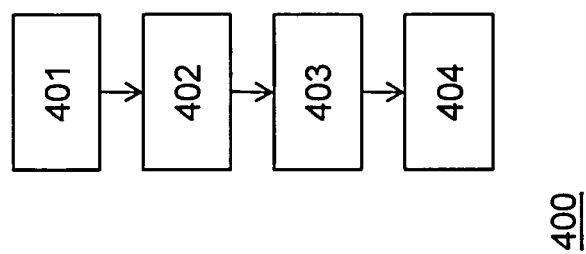
FIG. 4 shows a method of a call route select server in accordance with an embodiment of the second aspect of the invention.

With reference to FIG. 4, a method 400 of a call route select server according to an embodiment of the second aspect of the invention is described. The method 400 starts in step 401 with receiving a call route select request from a telephony terminal 201. In the next step 402, several possible call routes between the telephony terminal 201 and the destination of the call are determined. Then, in step 403, a preferred call route is selected among the plurality of possible call routes. Finally, in step 404 a call route select response is transmitted to the telephony terminal 201.

Figure 5:
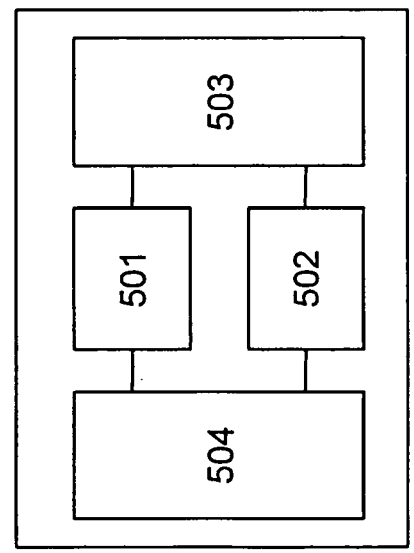
FIG. 5 shows a telephony terminal in accordance with an embodiment of the third aspect of the invention.

With reference to FIG. 5, a telephony terminal 500 in accordance with an embodiment of the third aspect of the invention is described. The telephony terminal 500 comprises first circuitry 501 being arranged for transmitting a call route select request to a call route select server 216, second circuitry 502 being arranged for receiving a call route select response from the call route select server 216, and third circuitry 503 being arranged for setting up the call according to the instructions received from the call route select server 216. The telephony terminal 500 further comprises circuitry 504 for interacting with the access network to which the telephony terminal is connected. In the case of a mobile phone, e.g., a radio unit 504 can be used for accessing a radio access network. In case of a fixed IP phone, a network interface 504 can be used for connection the phone to a fixed network.

Figure 6:
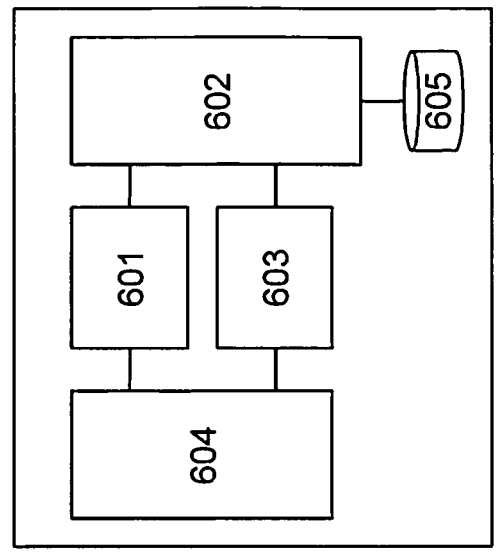
FIG. 6 shows a call route select server in accordance with an embodiment of the fourth aspect of the invention.

With reference to FIG. 6, a call route select server 600 in accordance with an embodiment of the fourth aspect of the invention is described. The call route select server 600 comprises first circuitry 601 being arranged for receiving a call route select request from a telephony terminal 201, second circuitry 602 being arranged for determining a preferred call route, and third circuitry 603 being arranged for transmitting a call route setup response to the telephony terminal 201 with information on how to setup the call. The call route select server 600 further comprises circuitry 604 for communicating with a network, e.g., the core network 103 or the IP network 108, such as a network interface 604. Further, the call route select server 600 comprises storage means 605 for storing, e.g., policies used in determining the preferred call route.

The circuitries described above can be implemented by electronic components, integrated circuits (IC), application specific integrated circuits (ASIC), field programmable gate arrays (FPGA), and/or complex programmable logic devices (CPLD), or any combination thereof. It will also be appreciated that any circuitry can, at least in part, be replaced by processing means, e.g., a processor executing an appropriate software. The storage means 606 can, e.g., be a hard disk or a random access memory (RAM).

While the invention has been illustrated and described in detail in the drawings and foregoing description, such illustration and description are to be considered illustrative or exemplary and not restrictive; the invention is not limited to the disclosed embodiments.

Variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program, or software, may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. Method of a telephony terminal for setting up a call between said telephony terminal and a destination of the call according to a preferred call route, said method comprising:
    the telephony terminal transmitting, to a call route select server, a call route select request comprising information pertaining to the destination of the call and at least one of information pertaining to the capabilities of the telephony terminal, available networks of the telephony terminal and location of the telephony terminal;
    the telephony terminal receiving, from the call route select server, a call route select response comprising a plurality of possible call setup directives or call routes between the telephony terminal and the destination of the call, the plurality of possible call setup directives or call routes being based on the information pertaining to the destination of the call and at least one of information pertaining to the capabilities of the telephony terminal, available networks of the telephony terminal and location of the telephony terminal comprised in the call route select request;
    the telephony terminal selecting a preferred call setup directive or call route of said plurality of possible call setup directives or call routes; and
    the telephony terminal setting up the call according to said preferred call setup directive or call route.

2. The method according to claim 1, wherein said call route select response further comprises a call identifier, and wherein the call is setup by two-stage dialing using said call identifier.

3. Method of a call route select server for providing a preferred call route for a call between a telephony terminal and a destination of the call, said method comprising:
    receiving, from the telephony terminal, a call route select request comprising information pertaining to the destination of the call and at least one of information pertaining to the capabilities of the telephony terminal, available networks of the telephony terminal and location of the telephony terminal;
    determining, based on the information pertaining to the destination of the call and at least one of information pertaining to the capabilities of the telephony terminal, available networks of the telephony terminal and location of the telephony terminal, a plurality of possible call setup directives or call routes between the telephony terminal and the destination of the call; and
    transmitting, to the telephony terminal, a call route select response comprising said plurality of possible call setup directives or call routes.

4. The method according to claim 3, wherein said call route select response comprises a call identifier, and wherein said call identifier is further transmitted to a two-stage dialing service provider.

5. A telephony terminal configured for setting up a call between said telephony terminal and a destination of the call according to a preferred call route, said telephony terminal comprising:
    first circuitry being arranged for transmitting, to a call route select server, a call route select request comprising information pertaining to the destination of the call and at least one of information pertaining to the capabilities of the telephony terminal, available networks of the telephony terminal and location of the telephony terminal;
    second circuitry being arranged for receiving, from the call route select server, a call route select response comprising a plurality of possible call setup directives or call routes between the telephony terminal and the destination of the call, the plurality of possible call setup directives or call routes being based on the information pertaining to the destination of the call and at least one of information pertaining to the capabilities of the telephony terminal, available networks of the telephony terminal and location of the telephony terminal;
    third circuitry being arranged for selecting a preferred call setup directive or route of said plurality of possible call setup directives or call routes; and
    fourth circuitry arranged for setting up the call according to said preferred call setup directive or call route.

6. The telephony terminal according to claim 5, wherein said fourth circuitry is further arranged for setting up a two-stage dialing call using a call identifier received by said second circuitry in said call route select response.

7. A call route select server configured for providing a preferred call route for a call between a telephony terminal and a destination of the call, said call route select server comprising:
    first circuitry being arranged for receiving, from a telephony terminal, a call route select request comprising information pertaining to the destination of the call and at least one of information pertaining to the capabilities of the telephony terminal, available networks of the telephony terminal and location of the telephony terminal;
    second circuitry being arranged for determining, based on the information pertaining to the destination of the call and at least one of information pertaining to the capabilities of the telephony terminal, available networks of the telephony terminal and location of the telephony terminal, a plurality of possible call setup directives or call routes between the telephony terminal and the destination of the call; and
    third circuitry being arranged for transmitting, to the telephony terminal, a call route select response comprising said plurality of possible call setup directives or call routes.

8. The call route select server according to claim 7, wherein said third circuitry is further arranged for transmitting a call identifier in said call route select response, and for transmitting said call identifier to a two-stage dialing service provider.

9. A non-transitory computer readable medium which comprises a computer readable program code adapted to be executed to implement the method according to claim 1 when the product is run on the computer.

10. A non-transitory computer readable medium which comprises a computer readable program code adapted to be executed to implement the method according to claim 3 when the product is run on the computer.

* * * * *